3,833,743
SOLUBILIZATION OF WATER AND AQUEOUS SOLUTIONS IN NON-AQUEOUS LIQUIDS
Lewis D. Morse, Princeton, Paul A. Hammes, Westfield, and Charles W. Everson, Warren, N.J., assignors to Merck & Co., Inc., Rahway, N.J.
No Drawing. Continuation of abandoned application Ser. No. 20,402, Mar. 17, 1970. This application Aug. 8, 1972, Ser. No. 279,131
Int. Cl. A23l 1/00, 1/26, 1/30
U.S. Cl. 426—195      4 Claims

ABSTRACT OF THE DISCLOSURE

Micelles are formed by surfactants above their critical micelle concentration and this is used to solubilize water and aqueous solutions in oils and other non-aqueous liquids.

---

This is a continuation of application Ser. No. 20,402, filed Mar. 17, 1970, now abandoned.

PRIOR ART

Aebi, C. M. and Wiebush, V. R., J. Colloid Sci., vol. 14, pp. 161–167; textbook entitled "Solubilization by Surface-Active Agents and its Application in Chemistry and the Biological Sciences," by P. H. Elworthy et al., Chapman and Hall, 1968.

This invention relates to the solubilization of water or aqueous solutions in non-aqueous liquids and particularly to a single phase system containing both water and oil. It is distinct from an emulsification which is a two phase system.

There are many instances of liquid preparations which contain both water and oil and which would desirably exist as an intimate mixture and not separate into two phases. One illustration of this is a water solution of ascorbic acid which is combined with, e.g., orange oil to make a palatable liquid preparation. Another illustration is a water solution of a water soluble vitamin such as $B_1$ and the solubilization of this water solution in, e.g., peanut oil. It obviously would be desirable that such mixturees of water solutions and an oil remain as an intimate mixture on standing and that they not separate into two phases.

Heretofore, this has been accomplished by the use of a suspending agent or an emulsifying agent so that a two-phase system results but objections have been made against such compositions because the agents may have a bad taste or have an adverse physiological effect. Another disadvantage of these prior mixtures is that the emulsion or suspension may break due to lack of stability.

The present invention utilizes the known but undeveloped technology involving micellization in non-aqueous systems. A feature of this invention is that a surfactant in solution will associate and form micelles above a certain concentration. The critical micelle concentration (CMC) is characteristic for a given surfactant-solvent system. The resulting micelles vary in respect to size, shape and complexity. The feature of the invention, therefore, is that aqueous solutions are solubilized in non-aqueous liquids by using surfactants above their critical micelle concentrations.

Solubilization occurs in the system of this invention because a micelle in non-aqueous solution can enclose solutions of water soluble substance to form a single-phase system. As the solubilized substance in this system is not dispersed in the non-aqueous material as a separate phase, it is not an emulsification. In practicing this invention, water or aqueous solutions are taken up by appropriate micelles formed by the selected surfactant. These surfactants may be any of the known molecules having a hydrophobic chemical group and a hydrophilic group and if, in the case of ingestibles, the molecules are physiologically acceptable.

The surfactant should amount to 0.5 to 20% by weight of the non-aqueous liquid to which it is added. Representative surfactants are:

dioctyl sodium sulfosuccinate
triglycerol monooleate
decaglycerol dioleate
ethoxylated stearic acid
caprylic acid
lecithin
n-dodecylamine caproate
n-octadecylamine caproate
hexanolamine oleate
hexanolamine caproate
α-monocaprin
α-monolaurin
α-monomyristin
α-monostearin
zinc caprylate
zinc laurate, or Ni, Mg, Cu
zinc myristate
zinc stearate
dinonylnaphthalene sulfonate
tripentylmethylbenzene sulfonate
polyethylene nonylphenol ether
dodecyl ammonium butyrate
dodecyl ammonium propionate.

The non-aqueous liquid will generally be an oil but it may be other hydrophobic liquid. Representative oils to which these surfactants are to be added are the common edible oils from corn, olives, cocoanuts, cotton seed, peanuts and similar sources. The hydrophobic liquids to which the surfactants are to be added can even be volatile ones which would be used as a carrier in applying the preparation and which may or may not be evaporated, such as n-hexane, and n-heptane. Other illustrations of this are in the examples.

The water to be combined with the surfactant-hydrophobic liquid system should constitute 0.5 to 20% by weight of that system. The substance dissolved in the water may be any water soluble medicine such as aspirin, a nutrient such as ascorbic acid or food additives such as flavors and flavor enhancers. The examples supply representative illustrations of these water soluble agents.

Examples which are typical of this invention are:

EXAMPLE 1

Dioctyl sodium sulfosuccinate (Cyanamid's Complemix N.F.), 0.5 gm. was dissolved in 5.0 gm. of Oil of Orange, U.S.P. to form a clear, one-phase system. This was titrated with water. 0.57 ml. water was added slowly with stirring. A clear, one-phase system resulted, and persisted for the one-half year period over which it was stored. Thus 11.4% water was solubilized.

EXAMPLE 2

A solution (I) was prepared by dissolving 2.5 gm. ascorbic acid in 10.0 ml. distilled water. A solution (II) was prepared by dissolving 1.0 gm. dioctyl sodium sulfosuccinate in 10.0 gm. orange oil.

1.0 ml. of solution I was added dropwise with stirring to the 11.0 gm. of solution II. A clear, one-phase system (III) resulted. Thus, ascorbic acid had been incorporated into the orange oil, at approximately 18.75 mg. ascorbic acid per ml. of the resultant liquid system. Analysis of III for ascorbic acid has shown the following changes with time:

| Time: | Ascorbic acid, mg./ml. of total system |
|---|---|
| Initial | 18.75 |
| 1 week | 15.40 |
| 2 week | 14.15 |
| 3 weeks | 12.70 |

EXAMPLE 3

A solution (I) was prepared by dissolving 1.0 gm. dioctyl sodium sulfosuccinate in 10.0 gm. orange oil. 1.0 ml. water was added to I with stirring, to form a one-phase system (II).

0.3333 gm. ascorbic acid was added to II. The system (III) was allowed to stir overnight. The next morning III was found to be one phase. Thus, III contained 28.1 mg. ascorbic acird per ml. III. The ascorbic acid was present in water as a 25.0% solution.

0.0833 gm. ascorbic acid was added to III, and the system (IV) was allowed to stir overnight. The next morning IV was found to be one phase. Thus, IV contained 35.0 mg. per ml. III. The ascorbic acid was present in water as a 29.41% solution.

EXAMPLE 4

I. 1.0 ml. water was solubilized in 10.0 gm. orange oil using 1.0 gm. dioctyl sodium sulfosuccinate.

II. 1.0 ml. of 20% aqueous ascorbic acid was solubilized in 10.0 gm. orange oil using 1.0 gm. dioctyl sodium sulfosuccinate.

Systems I and II were put into a refrigerator for overnight storage. The next morning system II was still a single phase, while system I showed precipitation. The micelles incorporating solution appeared to be more stable than the micelles incorporating only water.

EXAMPLE 5

Dioctyl sodium sulfosuccinate did not form water-solubilizing micelles in soybean oil. Benzyl alcohol added to soybean oil provided a medium in which micellization occurred. The solubilizing capacity of the solvent system increased as the quantity of benzyl alcohol was increased. This is shown in the following table. The surfactant is 10% w./w. of the blend.

| Percent $\phi CH_2OH$ in $\phi CH_2OH$/soybean oil blend | Percent $H_2O$ solubilized (based on weight of solvent) |
| --- | --- |
| 11.1 | 1.6 |
| 20.0 | 3.2 |
| 33.0 | 4.0 |
| 50.0 | 5.6 |
| 100.0 | 20.0 |

EXAMPLE 6

This example shows the use of this invention for adding heptane to bread dough to obtain its known benefit of getting a more uniform texture.

7.3 ml. n-heptane and 0.5 gm. sodium dioctyl sulfosuccinate were stirred to a single phase system (I). 0.55 ml. 20% aqueous ascorbic acid was added dropwise with stirring to I to form a single phase system (II).

At initial assay, the concentration of ascorbic acid was 14.92 mg./ml. II. At 1 week, the assay was 13.6 mg./ml. II. At 2 weeks, the assay was 12.6 mg./ml. II.

This preparation would be added to bread dough in an amount to supply the desired quantity of heptane. Hexane can be substituted for the heptane.

EXAMPLE 7

7.6 ml. n-hexane and 0.5 gm. sodium dioctyl sulfosuccinate were stirred to a single phase system (I). 0.55 ml. 20% aqueous ascorbic acid was added dropwise with stirring to I to form a single phase system (II).

At initial assay, the concentration of ascorbic acid was 14.62 mg./ml. II. At 1 week, the assay was 13.5 mg./ml. II. At 2 weeks, the assay was 12.3 mg./ml. II.

EXAMPLE 8

0.5 gm. sodium dioctyl sulfosuccinate was dissolved in 5.0 gm. n-heptane to yield a single phase system (I). 2.0 gm. ascorbic acid was dissolved in 8.0 gm. aqueous glycerine to form a clear solution (II). 0.55 ml. II was added dropwise with stirring to I to form a single phase system (III).

At initial assay the concentration of ascorbic acid was 14.35 mg./ml. III. At ten days, the assay was 13.2 mg./ml. III.

EXAMPLE 9

0.5 gm. sodium dioctyl sulfosuccinate was dissolved in 5.0 gm. n-hexane to yield a single phase system (I). 2.0 gm. ascorbic acid was dissolved in 8.0 gm. aqueous glycerine to form a clear solution (II). 0.55 ml. II was added dropwise with stirring to I to form a single phase system (III).

At initial assay the concentration of ascorbic acid was 14.38 mg. ascorbic acid/ml. III. At 10 days, the assay was 13.2 mg./ml. III. At 24 days, the assay was 12.36 mg./ml. III.

EXAMPLE 10

0.5 gm. sodium dioctyl sulfosuccinate dissolved in 5 gm. corn oil at 75° C. to yield a single phase (I) that persisted at room temperature. When 0.04 ml. aqueous ascorbic acid was added to I with stirring, a system (II) resulted with a persistent cloud.

When 0.45 gm. oleic acid was added to I, a one-phase system (III) resulted. 0.16 ml. 20% aqueous ascorbic acid was added to III dropwise with stirring. This led to a single phase system (IV).

EXAMPLE 11

1.0 gm. sodium dioctyl sulfosuccinate was dissolved in 10.0 ml. benzyl alcohol to yield 10.9 ml. system I.

4.0 ml. I was stirred into 10.9 ml. cottonseed oil to yield a single phase system (II). 0.48 ml. of 20% aqueous ascorbic acid was added dropwise to II to yield a single phase system (III), containing 6.4 mg. ascorbic acid/ml.

EXAMPLE 12

1.0 gm. sodium dioctyl sulfosuccinate was dissolved in 10.0 ml. benzyl alcohol to yield 10.9 ml. system I.

1.0 ml. 20% aqueous ascorbic acid was added dropwise with stirring to 6.5 ml. I to yield a single phase system (II).

II was added dropwise with stirring to 10.9 ml. cottonseed oil to yield a single phase system (III), containing 12.1 mg. ascorbic acid/ml.

EXAMPLE 13

2.0 gm. triglycerol monooleate and 6 mg. decaglycerol dioleate were dissolved in 10.9 ml. cottonseed oil to yield system I.

0.26 ml. 20% aqueous ascorbic acid was added slowly with stirring to I to yield a single phase system II, containing 4 mg. ascorbic acid/ml.

EXAMPLE 14

0.3 gm. ethoxylated stearic acid and 1.35 ml. caprylic acid were dissolved in 10.9 ml. cottonseed oil to yield system I.

0.08 ml. 20% aqueous ascorbic acid was added to I with stirring to yield a one-phase system II, containing 1.3 mg. ascorbic acid/ml.

The products of the above examples which contain ascorbic acid would be consumed in this form or would be added to beverages such as soft drinks. Products with other nutrients are illustrated by the following examples:

EXAMPLE 15

Prepare system III as in Example 2. Solution I can be replaced with a solution composed of 10.0 ml. water in which the following is dissolved using one or more of:

| | | |
| --- | --- | --- |
| Ascorbic acid | gm | 3.0 |
| Thiamine mononitrite | gm | 0.1 |
| Niacinamide | gm | 1.0 |
| Pyridoxine hydrochloride | mg | 0.2 |
| Cyanocobalamin | mg | 0.5 |
| Calcium pantothenate | mg | 0.5 |

EXAMPLE 16

Prepare system III as in Example 2. Solution I can be replaced with a solution composed of 10.0 ml. water in which 6 gm. ferrous sulfate heptahydrate has been dissolved.

EXAMPLE 17

Systems can be prepared as in Example 5, but in which 20% aqueous ascorbic acid is used in place of the water.

EXAMPLE 18

Systems can be prepared as in Example 5, but in which instead of water there is used a solution prepared by dissolving in 10.0 ml. water one or more of the following:

| | | |
|---|---|---|
| Ascorbic acid | gm | 3.0 |
| Thiamine mononitrate | gm | 0.1 |
| Niacinamide | gm | 1.0 |
| Pyridoxine hydrochloride | mg | 0.2 |
| Cyanocobalamin | mg | 0.5 |
| Calcium pantothenate | mg | 0.5 |

EXAMPLE 19

Systems can be prepared as in Example 5, but in which 37.5% aqueous ferrous sulfate heptahydrate is used in place of the water.

EXAMPLE 20

A system such as IV in Example 10 can be prepared in which instead of the 20% aqueous ascorbic acid being added to system III, there can be added a solution prepared by dissolving in 10 ml. water one or more of the following:

| | | |
|---|---|---|
| Ascorbic acid | gm | 3.0 |
| Thiamine mononitrate | gm | 0.1 |
| Niacinamide | gm | 1.0 |
| Pyridoxine hydrochloride | mg | 0.2 |
| Cyanocobalamin | mg | 0.5 |
| Calcium pantothenate | mg | 0.5 |

EXAMPLE 21

A system such as IV as in Example 10 can be prepared in which instead of aqueuos ascorbic acid being added to system III, there can be added a 5% solution of the anthelmintic, known as thiabendazole.

EXAMPLE 22

A system such as IV as in Example 10 can be prepared in which instead of aqueous ascorbic acid being added to system III, there can be added a 50% water solution of a commercially available mixture of disodium inosinate and disodium guanylate. These 5' nucleotides are taste enhancers. The finished product of nucleotides in vegetable oil can be incorporated in salad oils, to provide taste enhancement with salad dressing.

The nucleotides are ordinarily dephosphorylated in the presence of enzymes in raw meat, losing their taste enhancing character. The solubilized nucleotides would be protected from these enzymes. Thus they could be mixed with raw hamburger on commercial scale, for storage, shipment and later use. The solubilized nucleotides could also have use as a convenient method of adding said nucleotides to stews and also cooked meat at the table.

EXAMPLE 23

A system such as III in Example 11 can be prepared in which instead of ascorbic acid solution, a 50% solution of 5'-nucleotides is added to system II. The benefits of Example 22 would apply here.

EXAMPLE 24

A system such as in Example 10 can be prepared in which instead of corn oil, peanut oil is used. The peanut oil containing solubilized ascorbic acid can be incorporated in peanut butter.

EXAMPLE 25

A system such as in Example 10 can be prepared in which instead of aqueous ascorbic acid, there can be used a 50% aqueous solution of commercially available hickory smoke flavor, or similar condensed smoke flavor. The resultant product can be used to flavor traditionally smoked meats and poultry. The advantage would be better permeability through the meat tissue.

EXAMPLE 26

A system such as IV in Example 10 can be prepared in which instead of aqueous ascorbic acid being added to system III, there is added an aqueous solution containing 25% each of sodium nitrite and sodium nitrate.

The resultant product would be used in traditional meat curing operations. The non-aqueous phase would provide for increased perfusion of the meat tissue by the curing agents.

Advantages of this invention are:

(1) Water soluble materials can be added to liquids with which they are otherwise incompatible, e.g., (a) Water soluble nutrients into essential oils for inclusion in carbonated beverages and still drinks.
    (b) Water soluble nutrients into vegetable oils for inclusion on the surfaces of crackers, on the surfaces of cereals, in peanut butter.
    (c) Water soluble curing agents in oils for injection into meats for increased distribution throughout the tissue.
    (d) Water soluble taste enhancers solubilized in oils for protection from enzymes and for greater compatibility with meat.

(2) Increased stability of solubilized material. It is protected from oxidation, for instance, by the enclosing micelle.

(3) Materials of unpleasant taste solubilized in bland lipohilic liquids are taste masked.

(4) Hexane or heptane added to bread dough ingredients just before mixing, at about 0.5 to 0.6% alkane per 100 gm. flour, has a beneficial effect. The resultant bread has a smoother texture and more uniform grain structure than controls.

Ascorbic acid added to bread dough at about 10 p.p.m. flour leads to a reduction in mixing speed requirements of the dough. Ascorbic acid is short lived in dough; it is oxidized enzymatically and otherwise in processing.

Using this invention, one can incorporate ascorbic acid in the hexane, heptane or other organic solvents, thus, (a) The advantage of decreased mixing speed is combined with the textural benefits of the organic solvent.
    (b) Ascorbic acid, hidden within micellar structures, is protected from destruction.

Any of the "representative surfactants" listed above may be substituted for the specific ones in the examples if used between their critical micelle concentration and their maximum additive concentration. Also other water soluble nutrients and vitamins such as the B vitamins may replace the ascorbic acid as in Examples 15 and 16. Other water soluble medicines such as aspirin may replace the thiabendazole in Example 21.

The micellization that occurs in these examples involves an arrangement of the surfactant monomers so that their polar head groups are disposed in the center of the micelle and the hydrocarbon or hydrophobic groups extend outwardly into the non-aqueous solvent. It is this disposition of the hydrophobic group of the micelle, into the oil or other non-aqueous solvent which accounts for the completeness of the distribution or solution of the micelles throughout the solvent. Also, the aggregation of the hydrophillic or polar head groups at the center of the micelles serves as a solute for the aqueous solution (sometimes termed the solubilizate) containing the nutrient, medicinal or other edible or consumable material.

As this phenomena occurs practically on a molecular basis throughout the system the mixture is a solution and is not a two phase system such as results from an emulsification.

As the important aspect of the invention is the use of surfactant micelle formation to solubilize water soluble consumables in oils or non-aqueous liquids, the technical basis for this physical occurrence is not of considerable significance. Thus, a study of the change in energy at the interface between the hydrocarbon chain on micellization in the non-aqueous solvent is not of importance, nor is a study of the energy change arising from dipole-dipole interactions between head groups in the micelle center necessary in practicing the invention. The occurrence of micelle formation and particularly the CMC is readily determined by known factors such as light scattering, boiling-point elevation, freezing-point depression, sedimentation equilibrium, diffusion or viscosity or sedimentation velocity and many others such as the absence of a two-phase emulsion system which can be broken.

The size and shape of the micelles are not critical in practicing the invention, having in mind that a small micelle will necessarily absorb a small amount of the water solution. The more polar the monomer, the larger is the micelle formed therefrom. Some micelles may be formed of only a few or ten or so surfactant monomers whereas in contrast to such a small aggregation some large micelles may contain between 500 and 1000 monomers. The micelles need only to be so well formed that they form a colloidal solution in the non-aqueous liquid and that these colloidal particles take up and incorporate within themselves the material which otherwise is insoluble in the oil or oil-like solution.

The generalized requirement is that the surfactant be present at and preferably above its CMC in the non-aqueous liquid and that the solubilizate be present at and preferably below its ability to be absorbed in or on the surfactant. The upper limits are that the surfactant should not exceed its so-called MAC or maximum additive concentration and that the solubilizate should not exceed its ability to be absorbed in or on the surfactant. The percentage amounts mentioned in connection with the above list of representative surfactants is indicative of the probable physical ranges. If the maximum amounts have been exceeded this is ordinarily accompanied by a concomitant increase in opacity. Ordinarily, a visual examination will reveal turbidity and a departure from a single isotropic solution but more precise determination can be made by opacity meters and other conventional apparatus and tests for this purpose.

What is claimed is:

1. The method of solubilizing water-soluble orally consumable substances in a non-aqueous liquid which comprises combining together (1) a non-aqueous liquid comprising common edible oils selected from corn oil, olive oil, coconut oil, cottonseed oil, and peanut oil, or a hydrophobic liquid selected from n-hexane and n-heptane, (2) a pharmaceutically acceptable surfactant in an amount between its CMC and its MAC in said liquid, said surfactant being selected from the group consisting of dioctyl sodium sulfosuccinate, triglycerol monooleate, decaglycerol dioleate, ethoxylated stearic acid, caprylic acid, lecithin, n-dodecylamine caproate, n-octadecylamine caproate, hexanolamine oleate, hexanolamine caproate, α-monocaprin, α-monolaurin, α-monomyristin, α-monostearin, zinc caprylate, zinc laurate, zinc myristate, zinc stearate, dinonylnaphthalene sulfonate, tripentylmethylbenzene sulfonate, polyethylene nonylphenol ether, dodecyl ammonium butyrate, and dodecyl ammonium propionate, (3) water within the amount that will be absorbed by the surfactant, and (4) a water-soluble orally consumable substance within the amount that will dissolve in the water.

2. A solubilized one-phase system comprising a non-aqueous liquid comprising (1) a common edible oil selected from corn oil, olive oil, coconut oil, cottonseed oil, and peanut oil, or a hydrophobic liquid selected from n-hexane and n-heptane, (2) a pharmaceutically acceptable surfactant in an amount between its CMC and its MAC in said liquid, said surfactant being selected from the group consisting of dioctyl sodium sulfosuccinate, triglycerol monooleate, decaglycerol dioleate, ethoxylated stearic acid, caprylic acid, lecithin, n-dodecylamine caproate, n-octadecylamine caproate, hexanolamine oleate, hexanolamine caproate, α-monocaprin, α-monolaurin, α-monomyristin, α-monostearin, zinc caprylate, zinc laurate, zinc myristate, zinc stearate, dinonylnaphthalene sulfonate, tripentylmethylbenzene sulfonate, polyethylene nonylphenol ether, dodecyl ammonium butyrate, and dodecyl ammonium propionate, (3) water within the amount that will be absorbed by the surfactant, and (4) a water-soluble orally consumable substance within the amount that will dissolve in the water.

3. The system of claim 2 in which said substance is a food additive.

4. The system of claim 2 in which said substance is a flavoring agent.

References Cited

UNITED STATES PATENTS

| | | | |
|---|---|---|---|
| 3,117,929 | 1/1964 | McCoy et al. | 252—76 |
| 2,417,299 | 3/1947 | Freedman et al. | 99—11 |
| 3,254,714 | 6/1966 | Gogarty et al. | 166—274 |
| 3,307,628 | 3/1967 | Sena | 166—274 |
| 3,554,289 | 1/1971 | Webb | 166—274 |

OTHER REFERENCES

Martin's Physical Pharmacy, 1960, pp. 568–572.

Adamson: A Model for Micellar Emulsions, J. of Colloid & Interface Sci., vol. 29, No. 2, February 1969, 261–267.

MORRIS O. WOLK, Primary Examiner

S. MARANTZ, Assistant Examiner

U.S. Cl. X.R.

252—308, 312; 424—168, 280; 426—65, 72, 175, 194, 202, 209, 221